United States Patent
Gerecke

(10) Patent No.: US 9,860,106 B2
(45) Date of Patent: Jan. 2, 2018

(54) MULTI-SOURCE SENSOR STREAM VIRTUALIZATION

(71) Applicant: Raytheon Company, Waltham, MA (US)

(72) Inventor: William L. Gerecke, Stow, MA (US)

(73) Assignee: Raytheon Company, Waltham, MA (US)

( * ) Notice: Subject to any disclaimer, the term of this patent is extended or adjusted under 35 U.S.C. 154(b) by 577 days.

(21) Appl. No.: 14/022,665

(22) Filed: Sep. 10, 2013

(65) Prior Publication Data

US 2014/0075043 A1    Mar. 13, 2014

Related U.S. Application Data

(60) Provisional application No. 61/699,375, filed on Sep. 11, 2012.

(51) Int. Cl.
*G06F 15/16* (2006.01)
*H04L 29/06* (2006.01)

(52) U.S. Cl.
CPC ...... *H04L 29/0602* (2013.01); *H04L 65/4069* (2013.01); *H04L 65/605* (2013.01); *H04L 65/80* (2013.01)

(58) Field of Classification Search
CPC .......... H04L 29/0602; H04L 29/08558; H04L 65/4069; H04L 65/601–65/605; H04L 65/80; H04L 67/12; G06F 11/3089
See application file for complete search history.

(56) References Cited

U.S. PATENT DOCUMENTS

| | | | |
|---|---|---|---|
| 7,457,785 B1 * | 11/2008 | Greitzer | G01D 1/18 706/12 |
| 8,077,601 B2 | 12/2011 | Maze | |
| 8,091,109 B2 | 1/2012 | Li et al. | |
| 8,102,845 B2 | 1/2012 | Glaros et al. | |
| 2004/0186379 A1 | 9/2004 | Landry et al. | |
| 2006/0242325 A1 * | 10/2006 | Ramaswamy | H04H 20/95 709/246 |
| 2007/0118338 A1 * | 5/2007 | Grichnik | F02D 41/1401 703/2 |
| 2008/0013630 A1 * | 1/2008 | Li | H04N 19/63 375/240.16 |
| 2008/0224866 A1 * | 9/2008 | Rehman | G08B 13/2417 340/572.1 |

(Continued)

FOREIGN PATENT DOCUMENTS

WO    WO-2012/001215 A1    1/2012
WO    WO-2014043076 A1    3/2014

OTHER PUBLICATIONS

"International Application Serial No. PCT/US2013/058913, International Search Report dated Nov. 14, 2013", 4 pgs.

(Continued)

*Primary Examiner* — Lance L Barry
(74) *Attorney, Agent, or Firm* — Schwegman Lundberg & Woessner, P.A.

(57) ABSTRACT

Systems and methods for data stream virtualization are generally described herein. One or more embodiments of such a system can include a stream processing node, a physical sensor stream, a management node, a virtual sensor stream, or pairing logic.

17 Claims, 3 Drawing Sheets

(56) References Cited

U.S. PATENT DOCUMENTS

| | | | | |
|---|---|---|---|---|
| 2009/0118841 A1* | 5/2009 | Grichnik | ............ | G05B 23/0221 |
| | | | | 700/30 |
| 2009/0150324 A1* | 6/2009 | Dhanekula | ........... | G06N 99/005 |
| | | | | 706/52 |
| 2009/0254657 A1* | 10/2009 | Melnyk | ................... | H04L 47/10 |
| | | | | 709/224 |
| 2013/0096831 A1* | 4/2013 | Chan | ..................... | H04W 4/043 |
| | | | | 702/1 |
| 2013/0151666 A1* | 6/2013 | Hunter | .................. | G06Q 30/00 |
| | | | | 709/219 |
| 2013/0238535 A1* | 9/2013 | Leppanen | ............ | G06N 99/005 |
| | | | | 706/12 |
| 2014/0045501 A1* | 2/2014 | Cheung | ................ | H04W 36/18 |
| | | | | 455/437 |
| 2014/0068097 A1* | 3/2014 | Redelinghuys | .. | H04N 21/23439 |
| | | | | 709/231 |
| 2014/0181056 A1* | 6/2014 | Pidduck | ................. | G06F 17/30 |
| | | | | 707/697 |

OTHER PUBLICATIONS

"International Application Serial No. PCT/US2013/058913, Written Opinion dated Nov. 14, 2013", 5 pgs.

Raveandranathan, Nikhil, et al., "From Modeling to Implementation of Virtual Sensors in Body Sensor Networks", *IEEE Sensors Journal*, I2(3), (2012), 583-593.

"International Application Serial No. PCT/US2013/058913, International Preliminary Report on Patentability dated Mar. 26, 2015", 6 pgs.

* cited by examiner

MULTI-SOURCE SENSOR STREAM VIRTUALIZATION

CLAIM OF PRIORITY

This patent application claims the benefit of priority to U.S. Provisional Patent Application Ser. No. 61/699,375, titled "SYSTEM AND METHOD FOR MULTI-SOURCE SENSOR STREAM VIRTUALIZATION," filed on Sep. 11, 2012, which is hereby incorporated by reference herein in its entirety.

GOVERNMENT RIGHTS

This invention was made with Government support under Contract Number H94003-04-D-0006. The Government has certain rights in this invention.

TECHNICAL FIELD

This disclosure relates generally to virtualization of data.

BACKGROUND ART

The exploding growth of data and specifically sensing data streams brings unprecedented situational awareness, but not without problems. The deluge of data can burden communication, computational, management, and storage infrastructures.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DESCRIPTION OF THE EMBODIMENTS

Figure 1:
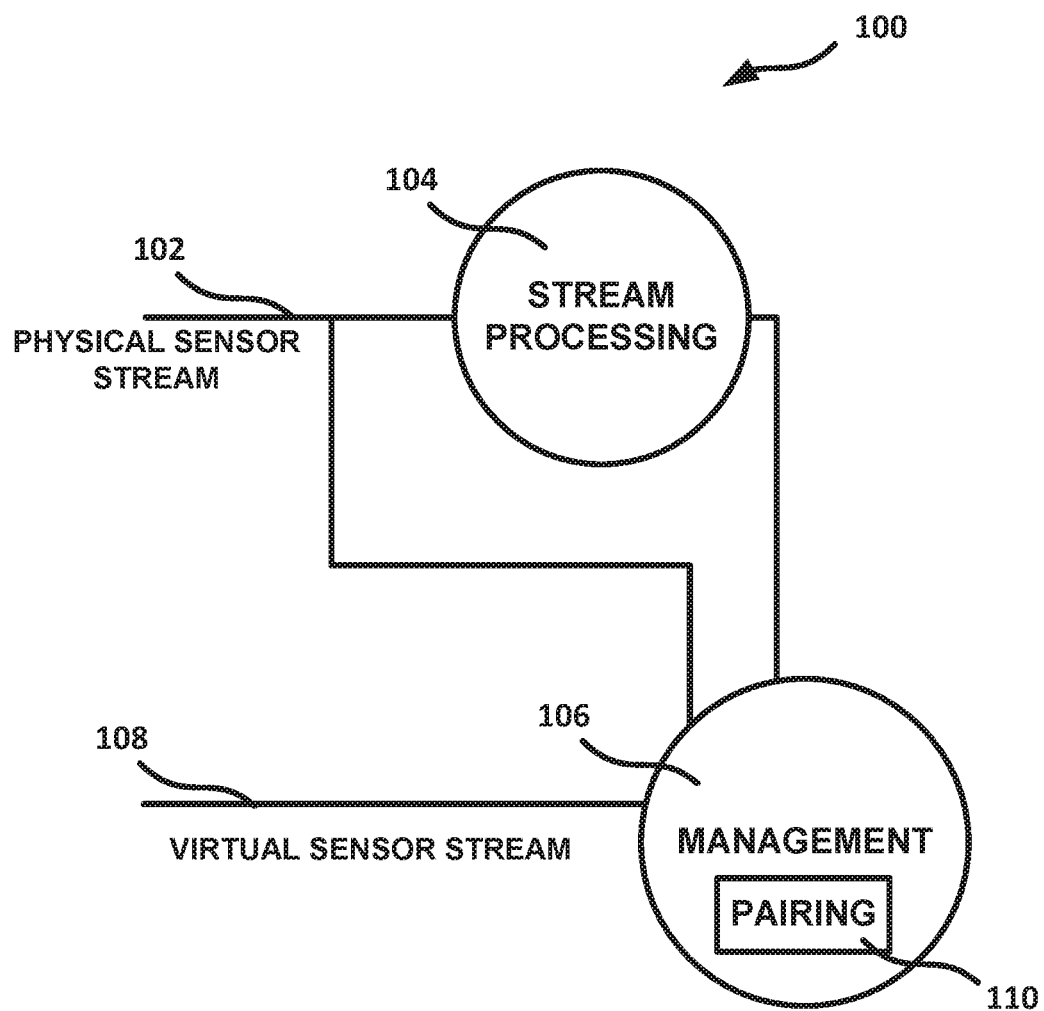
FIG. 1 shows an example of a system for sensor stream virtualization.

Consumers of sensor streams (e.g., video, moving target indicator, full-motion video, etc.) can face challenges arising from multiple communication paths, jitter in low priority sensor data, complex physical network connectivity, and scalability issues with larger numbers of streams. Virtualization of sensor streams before they reach the consumers can alleviate at least some of these challenges. Virtualization is achieved by dynamically mapping physical sensor streams to virtual sensor streams. The mapping can be defined using criteria, such as stream metadata, quality, priority, or grouping. Through application of virtual sensors a variety of problems can be solved, such as automatic selection of high definition (HD) or standard definition (SD) feeds and simplified handling of frequency hopping broadcast systems. One or more embodiments can solve problems in the sensor streaming application domain, such as by identifying and correcting problems with duplicate streams, identifying low quality streams, and handling the complexity of large numbers of streams. Metadata, video, and other stream characteristics that can be unique to sensor streams can be leveraged to perform intelligent routing, such as to facilitate decoupling streams from physical sources.

Sensing platforms are often equipped with multiple communication channels on which data streams can be disseminated. Also, networks can be complex, with consumers receiving similar or identical streams using different networks or network paths. Downstream systems which process these streams may have no mechanism to differentiate between duplicate streams or streams of inferior quality. Thus, the same stream can be processed multiple times, transmitted multiple times, or stored in multiple locations.

The bandwidth of existing networks may not be sufficient to carry the load of physical sensor data streams. Consumers of these streams can use time-division multiplexing on the streams, allocating bandwidth to streams of higher priority and switching to other streams as required or desired. This approach can have the undesired effect of downstream systems observing discontinuities in streams, which can impact quality and usability of the products from these systems.

The management and configuration of sensor sources, both analog and digital, can fail to scale to a larger number of sensors, and can be cumbersome and expensive. This can include tasks, such as configuring and maintaining the connectivity between physical source to physical connector and address pool de-confliction, management, or assignment.

These problems of redundant actions, stream discontinuities, and scalability issues of the manual management process can increase system cost and reduce system capacity, which in turn can reduce system effectiveness.

A problem discussed herein can be solved by automatically and dynamically identifying and pairing a physical source to a defined virtual sensor, such as by pairing a physical source with a well-matched (e.g., best available) virtual sensor. Automatically and dynamically identifying and pairing a physical source to a virtual sensor can include components such as one or more stream processing nodes, one or more physical sensor streams, one or more management nodes, one or more management node interfaces, one or more virtual sensor streams, or pairing logic.

FIG. 1 shows an example of a system 100 that can include a physical sensor stream 102, a stream processing node 104, a management node 106, a virtual sensor stream 108, or pairing logic 110.

A stream processing node 104 can be configured or defined. The stream processing nodes 104 can host software (SW), which can process streams. Stream processing nodes 104 can host capture device(s) to ingest analog sensor stream data (e.g., video data, metadata, audio data, etc.). Stream processing nodes 104 can host network device(s) to ingest digital sensor stream data (e.g. video data, metadata, audio data, etc.). The physical sensor stream 102 can be a digital or analog sensor stream.

The stream processing node 104 can be registered with or discovered by the management node 106. A user interactive management node 106 interface can be used to define or activate a physical sensor stream 102 ingestion. The management node 106 can define a physical sensor stream 102 priority, such as through the management node interface. The management node 106 can define a physical sensor stream 102 grouping, such as through the management node interface.

The management node interface can be used to define or activate virtual sensor streams 108 based on one or more of: 1) a virtual sensor stream 108 group; 2) a virtual sensor stream 108 quality level (e.g., high definition, low definition, standard definition, etc.); or 3) one or more virtual sensor stream 108 metadata defined requirements; among others.

A stream processing node 104 can carry out an ingest process which can conduct one or more of: 1) converting to standard digital form (e.g., normalization); 2) decoding stream meta-data; 3) determining or interpreting stream meta-data; 4) assessing stream quality; among others.

The management node 106 can execute pairing logic 110. Pairing logic 110 can interrogate a stream processing node 104 that is hosting a physical sensor stream 102 for one or more of: 1) group; 2) priority; 3) quality; or 4) metadata; among others.

The virtual sensor stream criteria can be evaluated against (e.g., compared to) physical sensor stream characteristics. Virtual sensor streams 108 with criteria that match the physical sensor stream characteristics can be paired with the corresponding physical sensor stream 102. At or around the time virtual sensor stream criteria and physical sensor stream characteristics no longer match, they can be decoupled.

A quality level associated with a physical sensor stream 102 can be assessed (e.g., determined or calculated). Stream quality can be assessed through evaluating a source data flow rule. The source data flow can be measured, such as by measuring the physical sensor stream's source data-flow. When the physical sensor stream 102 includes a source data flow that falls below a defined threshold, an amount of jitter that falls below a defined threshold, or packet continuity falls below a defined threshold, the source data flow can be considered low quality.

If a physical sensor stream 102 is evaluated for the presence of meta-data and meta-data is discovered (e.g., detected), then the physical sensor stream 102 can be considered high quality.

A physical sensor stream 102, such as a video stream, can be analyzed for color differentiation. If a color composition of the physical sensor stream 102 is analyzed and all components are within a specified range, such as within a specified range of a mean, the stream can be considered to be of substantially uniform color and considered to be low quality.

A physical sensor stream 102, such as a video stream, can be analyzed for the presence of uniform horizontal or vertical lines. If substantially uniform horizontal or vertical lines are detected then the physical sensor stream 102 can be considered a test pattern and considered to be low quality.

A physical sensor stream 102, such as a video stream, can be analyzed for the presence of motion. If it is determined that the physical sensor stream 102 includes substantially no motion, the physical sensor stream 102 can be considered static or frozen and considered low quality.

A physical sensor stream 102, such as a video stream, can be analyzed for an attribute typical of a screen saver, such as repetition or an object in motion within the boundaries of the screen, among others. If one or more screen saver attributes is detected the physical sensor stream 102 can be considered low quality.

Determining if paired sensors should be decoupled can be based on (e.g., a function of) an outcome of a criteria evaluation. A criteria evaluation can have at least three possible outcomes: 1) the criteria matches (e.g., one or more of the physical sensor stream characteristics matches the virtual sensor stream criteria); 2) the criteria contradicts (e.g., the physical sensor stream characteristics do not match the virtual sensor stream characteristics or at least one of the physical sensor stream characteristics does not match the virtual sensor stream characteristics); or 3) the criteria cannot be evaluated (e.g., either the physical sensor stream characteristics or the virtual sensor stream criteria do not exist or some other problem exists making it impossible or very difficult to evaluate the sensor stream characteristics or criteria).

Based on possible outcomes, the corresponding decoupling process can be carried out. Hysteresis can be introduced to prevent pair "ping-pong," such as in response to transient conditions in streams (e.g., hysteresis can help ensure that a physical sensor stream will not be paired with a first virtual sensor stream at one moment, a second virtual sensor stream at another moment, and then again with the first virtual sensor at another moment shortly thereafter). An example of hysteresis can include, if, for an existing pair (e.g., a coupled or matched virtual sensor stream and physical sensor stream) a virtual sensor stream's criteria fails to match for a specified amount of time (e.g., an uncoupling time), such as a time in seconds, the pair can be uncoupled.

At or around the time a virtual sensor criterion is contradicted, a pair can be decoupled. Such decoupling can include at least the following cases: 1) matching metadata criteria fails because a different metadata value is present in the metadata of the physical sensor stream 102 or the virtual sensor stream 108; 2) the media corresponding to the sensor stream is considered invalid; or 3) a higher priority physical sensor stream 102 or virtual sensor stream 108 becomes valid, such as a physical sensor stream 102 or a virtual sensor stream 108 within a group.

In one or more embodiments, if, after a specified period of time, insufficient information is available to evaluate either the physical sensor stream characteristics or the virtual sensor stream criteria the corresponding pair can be eligible for being paired with another sensor stream. Such embodiments can include where matching cannot be evaluated because data is not found or is otherwise unavailable, such as when metadata is unavailable.

Figure 2:
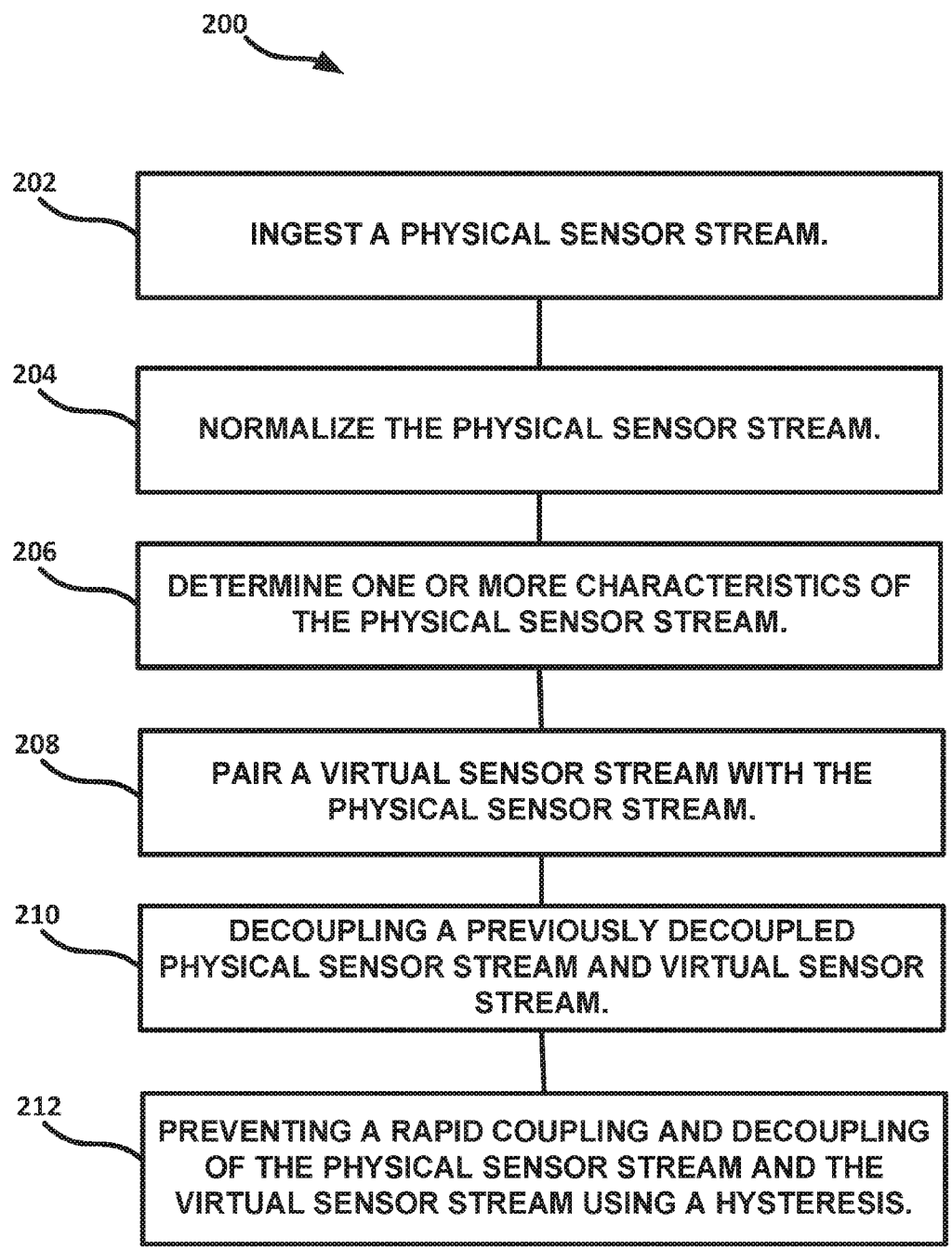
FIG. 2 shows an example of a technique for sensor stream virtualization.

FIG. 2 shows an example of a technique 200 for sensor stream virtualization. At 202, a physical sensor stream can be ingested, such as by using the stream processing node 104. At 204, the physical sensor stream can be normalized, such as by using the stream processing node 104. At 206, one or more characteristics of the physical sensor stream can be determined, such as by using the stream processing node 104. At 208, a virtual sensor stream can be paired with the physical sensor stream. The pairing can be made as a function of criteria of the virtual sensor stream and the characteristics of the physical sensor stream. Pairing the streams can be a function of a first stream quality indicator of the physical sensor stream and a second stream quality indicator of the virtual sensor stream, a physical sensor stream grouping characteristic, or a physical sensor stream priority indicator.

The technique 200 can include categorizing metadata of the physical sensor stream, such as by using the stream processing node 104. The pairing of the streams can be done as a function of the categorized metadata. The technique 200 can include, at 210, decoupling a previously coupled physical sensor stream and virtual sensor stream in response to determining that the characteristics of the physical stream no longer sufficiently matches the criteria of the virtual sensor stream (e.g., is no longer the best match). The technique 200 can include, at 212, preventing a rapid coupling and decoupling of the physical sensor stream and the virtual sensor stream using a hysteresis, such as a hysteresis of the management node 106.

Figure 3:
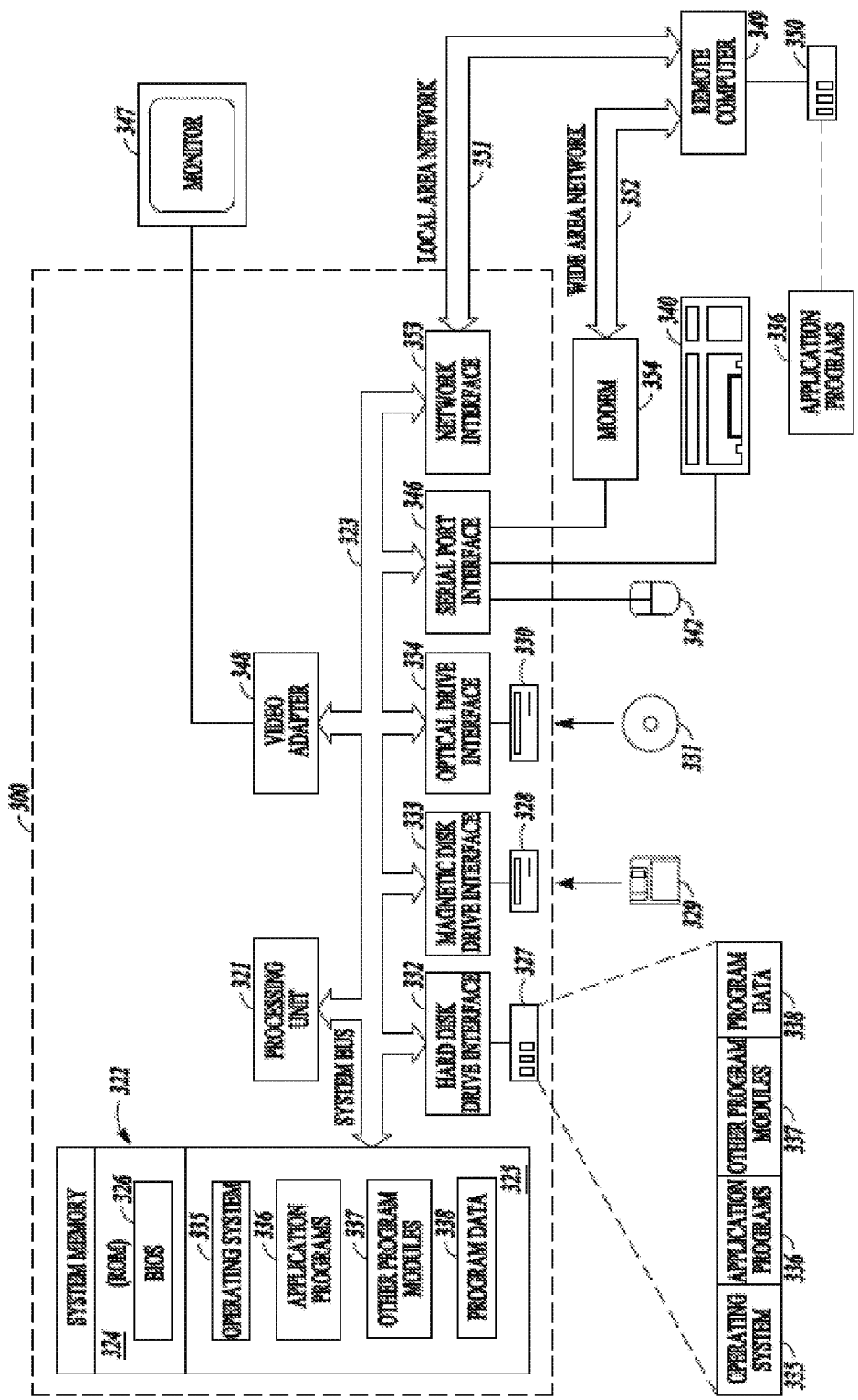
FIG. 3 shows an example of a computer system.

FIG. 3 is a block diagram of a computer system to implement methods, according to an example embodiment.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 300 (e.g., a personal computer, workstation, or server), including one or more processing units 321, a system memory 322, and a system bus 323 that operatively couples various system components including the system memory 322 to the processing unit 321. There can be only one or there can be more than one processing unit 321, such that the processor of computer 300 comprises a single CPU, or a plurality of processing units, commonly referred to as a multiprocessor or parallel-processor environment. In various embodiments, computer 300 is a conventional computer, a distributed computer, or any other type of computer.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 325. A basic input/output system (BIOS) program 326, containing the basic routines that help to transfer information between elements within the computer 300, such as during start-up, can be stored in ROM 324. The computer 300 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non volatile storage of computer-readable instructions, data structures, program modules and other data for the computer 300. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324, or RAM 325, including an operating system 335, one or more application programs 336, other program modules 337, and program data 338. Programming for implementing one or more processes or method described herein can be resident on any one or number of these computer-readable media.

A user can enter commands and information into computer 300 through input devices such as a keyboard 340 and pointing device 342. Other input devices (not shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type of display device can also be connected to the system bus 323 via an interface, such as a video adapter 348.

The monitor 347 can display a graphical user interface for the user. In addition to the monitor 347, computers typically include other peripheral output devices (not shown), such as speakers and printers.

The computer 300 can operate in a networked environment using logical connections to one or more remote computers or servers, such as remote computer 349. These logical connections are achieved by a communication device coupled to or a part of the computer 300; the invention is not limited to a particular type of communications device. The remote computer 349 can be another computer, a server, a router, a network PC, a client, a peer device or other common network node, and typically includes many or all of the elements described above I/O relative to the computer 300, although only a memory storage device 350 has been illustrated. The logical connections depicted in FIG. 3 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 300 is connected to the LAN 351 through a network interface or adapter 353, which is one type of communications device. In some embodiments, when used in a WAN-networking environment, the computer 300 typically includes a modem 354 (another type of communications device) or any other type of communications device, e.g., a wireless transceiver, for establishing communications over the wide-area network 352, such as the internet. The modem 354, which can be internal or external, is connected to the system bus 323 via the serial port interface 346. In a networked environment, program modules depicted relative to the computer 300 can be stored in the remote memory storage device 350 of remote computer 349. It is appreciated that the network connections shown are exemplary and other means of, and communications devices for, establishing a communications link between the computers can be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Additional Notes and Examples

In Example 1, a system can include a stream processing node configured to ingest a physical sensor stream including normalizing a physical sensor stream and determining one or more characteristics of the physical sensor stream.

In Example 2 the management node of Example 1 can be configured to pair a virtual sensor stream with the physical sensor stream as a function of criteria of the virtual sensor stream and the characteristics of the physical sensor stream.

In Example 3, the characteristics of the physical sensor stream of at least one of Examples 1-2 can include a first stream quality indicator and the criteria of the virtual sensor stream can include a second stream quality indicator.

In Example 4, the stream processing node of at least one of Examples 1-3 can be configured to categorize metadata of the physical sensor stream and the management node can be configured to pair the physical sensor stream with the virtual sensor stream as a function of the categorized metadata.

In Example 5, the characteristics of at least one of Examples 1-4 can include a physical sensor stream priority indicator.

In Example 6, the characteristics of at least one of Examples 1-5 can include a physical sensor stream grouping indicator.

In Example 7, the management node of at least one of Examples 1-6 can be configured to decouple a previously coupled physical sensor stream and virtual sensor stream in response to determining that the characteristics of the physical sensor stream no longer sufficiently match the criteria of the virtual sensor stream.

In Example 8, the management node of at least one of Examples 1-7 can include a hysteresis configured to prevent a rapid coupling and decoupling of the physical sensor stream and the virtual sensor stream.

In Example 9a method can include ingesting a physical sensor stream using a stream processing node.

In Example 10, the method of at least one of Examples 1-9 can include normalizing the physical sensor stream using the stream processing node.

In Example 11, the method of at least one of Examples 1-10 can include determining one or more characteristics of the physical sensor stream using the stream processing node.

In Example 12, the method of at least one of Examples 1-11 can include pairing a virtual sensor stream with the physical sensor stream as a function of criteria of the virtual sensor stream and the characteristics of the physical sensor stream.

In Example 13, pairing the virtual sensor stream with the physical sensor stream of at least one of Examples 1-12 can include pairing the streams as a function of a first stream quality indicator of the physical sensor stream and a second stream quality indicator of the virtual sensor stream.

In Example 14, the method of at least one of Examples 1-13 can include categorizing, using the stream processing node, metadata of the physical sensor stream.

In Example 15, pairing the physical sensor stream with the virtual sensor stream of at least one of Examples 1-14 can include pairing the streams as a function of the categorized metadata.

In Example 16, pairing the physical sensor stream with the virtual sensor stream of at least one of Examples 1-15 can include pairing the streams as a function of a physical sensor stream priority indicator.

In Example 17, pairing the physical sensor stream with the virtual sensor stream of at least one of Examples 1-16 can include pairing the streams as a function of a physical sensor stream grouping characteristic.

In Example 18, the method of at least one of Examples 1-17 can include decoupling, using the management node, a previously coupled physical sensor stream and virtual sensor stream in response to determining that the characteristics of the physical sensor stream no longer sufficiently matches the criteria of the virtual sensor stream.

In Example 19, the method of at one of Examples 1-18 can include preventing a rapid coupling and decoupling of the physical sensor stream and the virtual sensor stream using a hysteresis of the management node.

In Example 20 a machine readable storage device that stores instructions, the instructions, which when performed by a machine, cause the machine to perform operations, the operations including ingesting a physical sensor stream using a stream processing node.

In Example 21, the operations of at least one of Examples 1-20 can include normalizing the physical sensor stream using the stream processing node.

In Example 22, the operations of at least one of Examples 1-21 can include determining one or more characteristics of the physical sensor stream using the stream processing node.

In Example 23, the operations of at least one of Examples 1-22 can include pairing a virtual sensor stream with the physical sensor stream as a function of criteria of the virtual sensor stream and the characteristics of the physical sensor stream.

In Example 24, the instructions for pairing the virtual sensor stream with the physical sensor stream of at least one of Examples 1-23 can include instructions for pairing the streams as a function of a first stream quality indicator of the physical sensor stream and a second stream quality indicator of the virtual sensor stream.

In Example 25, the operations of at least one of Examples 1-24 can include categorizing, using the stream processing node, metadata of the physical sensor stream.

In Example 26, the instructions for pairing the physical sensor stream with the virtual sensor stream of at least one of Examples 1-25 can include instructions for pairing the streams as a function of the categorized metadata.

In Example 27, the instructions for pairing the physical sensor stream with the virtual sensor stream include of at least one of Examples 1-26 can include instructions for pairing the streams as a function of a physical sensor stream priority indicator.

In Example 28, the instructions for pairing the physical sensor stream with the virtual sensor stream of at least one of Examples 1-27 can include instructions for pairing the streams as a function of a physical sensor stream grouping characteristic.

In Example 29, the operations of at least one of Examples 1-28 can include decoupling, using the management node, a previously coupled physical sensor stream and virtual sensor stream in response to determining that the characteristics of the physical sensor stream no longer sufficiently matches the criteria of the virtual sensor stream.

In Example 30, the operations of at least one of Examples 1-29 can include preventing a rapid coupling and decoupling of the physical sensor stream and the virtual sensor stream, using a hysteresis of the management node.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the disclosed subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The functions or algorithms described herein are implemented in hardware, software, or a combination of software and hardware in some embodiments. The software can comprise computer executable instructions stored on computer readable media such as memory or other type of storage devices. Further, described functions can correspond to modules, which can be software, hardware, firmware, or any combination thereof. Multiple functions are performed in one or more modules as desired, and the embodiments described are merely embodiments. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, process flows can be applicable to software, firmware, and hardware implementations.

Systems and methods of the present disclosure can be implemented on a mobile device as a mobile application, web-based application, on a desktop computer as a computer application, or a combination thereof. A mobile application can operate on a Smartphone, tablet computer, portable digital assistant (PDA), ruggedized mobile computer, or other mobile device. The mobile device can be connected to the Internet or network via Wi-Fi, Wide Area Network (WAN), cellular connection, WiMax, Serial Front Panel Data Port (Serial FPDP), Rapid I/O (Input/Output) Transport, or any other type of wired or wireless method of networking connection. In some embodiments, a web-based application can be delivered as a software-as-a-service (SaaS) package (e.g. cloud-based embodiments) accessible via a device app, a web browser application, or other suitable application, depending on the particular embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   a stream processing node including one or more first hardware processors configured to ingest a physical sensor data stream including converting the physical sensor data stream to a standard digital form, and determine characteristics of the physical sensor data stream including decoding physical sensor data stream meta-data, interpreting the decoded physical sensor metadata to determine one or more characteristics of the physical sensor data stream, and assessing a quality of the physical sensor data stream, assessing the quality of the physical sensor data stream including a determination the physical sensor data stream corresponds to a low quality sensor stream in response to determining one of (1) the physical sensor data stream includes a packet continuity that falls below a defined continuity threshold, (2) an amount of jitter in the physical sensor data stream fall below a defined jitter threshold, (3) the physical sensor data stream includes color components that are within a specified range of a mean color value, (4) the physical sensor data stream includes uniform horizontal or vertical lines, and (5) the physical sensor data stream includes substantially no motion; and
   a management node including one or more second hardware processors and pairing logic configured to pair a virtual sensor data stream with the physical sensor data stream as a function of criteria of the virtual sensor data stream and the characteristics of the physical sensor data stream and to virtualize the physical sensor data stream if the characteristics match the criteria, and decouple a paired physical sensor data stream and virtual sensor data stream in response to determining meta-data of the virtual sensor data stream no longer matches the decoded physical sensor data stream meta-data or another physical sensor data stream with a higher priority than the physical sensor data stream becomes valid.

2. The system of claim 1, wherein the stream processing node is configured to categorize metadata of the physical sensor data stream and the management node is configured to pair the physical sensor data stream with the virtual sensor data stream as a function of the categorized metadata.

3. The system of claim 2, wherein the characteristics include a physical sensor stream priority indicator.

4. The system of claim 3, wherein the characteristics include a physical sensor stream grouping indicator.

5. The system of claim 4, wherein the management node is configured to decouple a previously coupled physical sensor data stream and virtual sensor data stream in response to determining that the characteristics of the physical sensor data stream no longer sufficiently match the criteria of the virtual sensor data stream.

6. The system of claim 5, wherein the management node includes a hysteresis configured to prevent a rapid coupling and decoupling of the physical sensor data stream and the virtual sensor data stream, the hysteresis including requiring the criteria to not match for a specified amount of time prior to decoupling the paired virtual sensor data stream and the physical sensor data stream.

7. A method comprising:
   ingesting a physical sensor data stream using one or more hardware processors of a stream processing node, wherein ingesting includes converting the physical sensor data stream to a standard digital form, decoding physical sensor data stream meta-data, interpreting the decoded physical sensor meta-data to determine one or more characteristics of the physical sensor data stream, and assessing a quality of the physical sensor data stream; and pairing, using one or more hardware processors of a management node communicatively coupled to the stream processing node, a virtual sensor data stream with the physical sensor data stream as a function of criteria of the virtual sensor data stream and the characteristics of the physical sensor data stream;

virtualizing the physical sensor data stream;

determining the physical sensor data stream corresponds to a low quality sensor stream in response to determining one of (1) the physical sensor data stream includes a packet continuity that falls below a defined continuity threshold, and (2) an amount of jitter in the physical sensor data stream fall below a defined jitter threshold; and decoupling a paired physical sensor data stream and virtual sensor data stream in response to determining meta-data of the virtual sensor data stream no longer matches the decoded physical sensor data stream meta-data or another physical sensor data stream with a higher priority than the physical sensor data stream becomes valid.

8. The method of claim 7, further comprising:

categorizing, using the stream processing node, metadata of the physical sensor data stream; and wherein pairing the physical sensor data stream with the virtual sensor data stream includes pairing the streams as a function of the categorized metadata.

9. The method of claim 8, wherein pairing the physical sensor data stream with the virtual sensor data stream includes pairing the streams as a function of a physical sensor stream priority indicator.

10. The method of claim 9, wherein pairing the physical sensor data stream with the virtual sensor data stream includes pairing the streams as a function of a physical sensor stream grouping characteristic.

11. The method of claim 10, further comprising:

decoupling, using the management node, a previously coupled physical sensor data stream and virtual sensor data stream in response to determining that the characteristics of the physical sensor data stream no longer sufficiently matches the criteria of the virtual sensor data stream.

12. The method of claim 11, further comprising:

preventing a rapid coupling and decoupling of the physical sensor data stream and the virtual sensor data stream using a hysteresis of the management node, the hysteresis including requiring the criteria to not match for a specified amount of time prior to decoupling the paired virtual sensor data stream and the physical sensor data stream.

13. A machine readable storage device that stores instructions, the instructions, which when performed by a machine, cause the machine to perform operations comprising:

ingesting a physical sensor data stream using one or more hardware processors of a stream processing node, wherein ingesting includes converting the physical sensor data stream to a standard digital form, decoding physical sensor data stream meta-data, interpreting the decoded physical sensor meta-data to determine one or more characteristics of the physical sensor data stream, and assessing a quality of the physical sensor data stream; and pairing, using one or more hardware processors of a management node communicatively coupled to the stream processing node, a virtual sensor data stream with the physical sensor data stream as a function of criteria of the virtual sensor data stream and the characteristics of the physical sensor data stream;

providing the virtual sensor data stream as the physical sensor data stream;

determining the physical sensor data stream corresponds to a low quality sensor stream in response to determining one of (1) the physical sensor data stream includes color components that are within a specified range of a mean color value, (2) the physical sensor data stream includes uniform horizontal or vertical lines, and (3) the physical sensor data stream includes substantially no motion; and decoupling a paired physical sensor data stream and virtual sensor data stream in response to determining meta-data of the virtual sensor data stream no longer matches the decoded physical sensor data stream meta-data or another physical sensor data stream with a higher priority than the physical sensor data stream becomes valid.

14. The storage device of claim 13, further comprising instructions, which when executed by the machine, cause the machine to perform operations comprising:

categorizing, using the stream processing node, metadata of the physical sensor data stream; and wherein the instructions for pairing the physical sensor data stream with the virtual sensor data stream include instructions for pairing the streams as a function of the categorized metadata.

15. The storage device of claim 14, wherein the instructions for pairing the physical sensor data stream with the virtual sensor data stream include instructions for pairing the streams as a function of a physical sensor stream priority indicator.

16. The storage device of claim 15, wherein the instructions for pairing the physical sensor data stream with the virtual sensor data stream include instructions for pairing the streams as a function of a physical sensor stream grouping characteristic.

17. The storage device of claim 16, further comprising instructions, which when executed by the machine, cause the machine to perform operations comprising:

decoupling, using the management node, a previously coupled physical sensor data stream and virtual sensor data stream in response to determining that the characteristics of the physical sensor data stream no longer sufficiently matches the criteria of the virtual sensor data stream; and preventing a rapid coupling and decoupling of the physical sensor data stream and the virtual sensor data stream using a hysteresis of the management node, the hysteresis including requiring the criteria to not match for a specified amount of time prior to decoupling the paired virtual sensor data stream and the physical sensor data stream.

* * * * *